United States Patent
Wu et al.

(10) Patent No.: US 7,543,940 B2
(45) Date of Patent: Jun. 9, 2009

(54) VIRTUAL INPUT ELEMENT IMAGE PROJECTION APPARATUS

(75) Inventors: Ching-Chin Wu, Hsinchu (TW); Ying-Tsung Lu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 972 days.

(21) Appl. No.: 10/868,787

(22) Filed: Jun. 17, 2004

(65) Prior Publication Data

US 2005/0128185 A1    Jun. 16, 2005

(30) Foreign Application Priority Data

Dec. 16, 2003  (TW) .............................. 92135606 A

(51) Int. Cl.
| | |
|---|---|
| G03B 21/26 | (2006.01) |
| G02B 5/18 | (2006.01) |
| G02B 27/42 | (2006.01) |
| G02B 21/22 | (2006.01) |
| G03B 21/60 | (2006.01) |
| G02B 27/22 | (2006.01) |

(52) U.S. Cl. ............................ 353/10; 353/30; 359/558; 359/563; 359/366; 359/378; 359/466

(58) Field of Classification Search .................. 353/10, 353/30; 359/27, 558, 563, 19, 366, 376, 359/378, 458, 462, 466

See application file for complete search history.

(56) References Cited

U.S. PATENT DOCUMENTS

| 6,266,048 B1 | 7/2001 | Carau, Sr. |
| 6,614,422 B1 | 9/2003 | Rafi et al. |
| 2004/0263977 A1 * | 12/2004 | Toyoda et al. ............... 359/558 |

* cited by examiner

*Primary Examiner*—Diane I Lee
*Assistant Examiner*—Magda Cruz
(74) *Attorney, Agent, or Firm*—Birch, Stewart, Kolasch & Birch, LLP

(57) ABSTRACT

A virtual input element image projection apparatus couples a suitable lens and an optical element to increase the diverging angle of a virtual input element image or generate a plurality of portions of the virtual input element image that are coupled to form the complete virtual input element image without reducing diffraction efficiency. The projection distance for generating the virtual input element image may also be shortened.

7 Claims, 4 Drawing Sheets

VIRTUAL INPUT ELEMENT IMAGE PROJECTION APPARATUS

This Nonprovisional application claims priority under 35 U.S.C. § 119(a) on Patent Application No(s). 092135606 filed in TAWIAN, R.O.C. on Dec. 16, 2003, the entire contents of which are hereby incorporated by reference.

BACKGROUND OF THE INVENTION

1. Field of the Invention

The present invention relates to an apparatus for generating virtual element images, particularly to a virtual input element image projection apparatus.

2. Related Art

Being slim and light and having a low noise level are the prevailing trends for the development of portable electronic products. The commonly used keyboard input element, due to visual constraint and ergonomic dimensional consideration, has little room for further shrinking. Moreover, user's habits mostly still incline to using a larger keyboard input element. Although there are many alternative input elements, such as a hand written panel, voice, light pen, and the like. To the great user population who are used to keyboard input, the habit of using keyboard input is unlikely to be substituted by other methods.

Hence the virtual keyboard was developed and introduced. For users who are accustomed to using the keyboard, it does not generate noise, takes little space, and is portable. It generally adopts a digital micro mirror display technique to project the keyboard image. U.S. Pat. No. 6,266,048 discloses such a technique. It displays keyboard and screen patterns on a flat surface by projection, and uses an electronic device to emit two laser beams, and has two optical sensors on the bottom to detect light reflection angles while user's fingers do input operation. The angles detected by the two optical sensors are used to determine finger-input positions on the keyboard. It requires complicated signals, controlling laser light, to do a two-dimensional scan rapidly. To adopt that technique for inputting devices on consumer electronic products, is too costly and cannot meet market requirements.

There is another technique that employs diffractive optical elements (DOE) in the virtual keyboard image projection apparatus. U.S. Pat. No. 6,614,422 discloses such a technique. It has a diffractive projection system, which contains at least one diffractive optical element to project virtual keyboard images. According to the diffraction principle, the emission angle of the virtual keyboard image generated by the diffractive optical element is determined by forming line width of the diffractive optical element. The smaller the line width, the bigger the diverging angle of the keyboard image becomes. Thus it can generate a large angle diverging keyboard image at a relatively short distance. However, due to technical limitation of the semiconductor manufacturing process, the smaller line width requires a more complex fabrication process. Moreover, the diffractive optical elements mostly are multi-stage structured, and require a higher precision in the fabrication process. With the diffractive optical elements having a narrower line width, the diffraction efficiency decreases. Due to the foregoing reasons, the virtual keyboard images generated by the projection apparatus that employ diffractive optical elements do not have a large enough diverging angle.

SUMMARY OF THE INVENTION

In view of the aforesaid disadvantages, the present invention aims to provide a virtual input element image projection apparatus that has an optical element assembly to couple with a suitable lens to increase the diverging angle of the virtual input element image without lowering the diffraction efficiency. Thereby, the invention shortens the projection distance of the virtual input element image.

The virtual input element image projection apparatus according to the invention is adopted for use on electronic products to provide virtual input element images. It includes a light source, a diffractive optical element and a projection lens. The light source provides a light beam. The diffractive optical element receives the light beam and generates a virtual input element image light beam with a diverging angle. The projection lens is used to increase the diverging angle of the virtual input element image light beam. The light beam emitted by the light source passes through the diffractive optical element to form the virtual input element image light beam, then passes through the projection lens to form a virtual input element image. The invention is especially desirable for generating a larger projection and detection area for the virtual input element at a shorter projection distance, such as a virtual keyboard.

In addition, the projection distance for generating the virtual input element image may be reduced by coupling the virtual input element images. The virtual input element image projection apparatus may include a plurality of image projection assemblies. Each of the image projection assemblies includes a light source and a diffractive optical element. The light source provides a light beam. The diffractive optical element receives the light beam and generates a portion of a virtual input element image. Each portion of the virtual input element image is coupled to form a complete virtual input element image.

Another coupling method is using a single light source. The light beam, being emitted, passes through a spectroscopic element to form a first light beam and a second light beam, then passes through respectively a first diffractive optical element and a second diffractive optical element to form a first virtual input element image and a second virtual input element image that are coupled to form a complete virtual input element image.

The foregoing, as well as additional objects, features and advantages of the invention will be more readily apparent from the following detailed description, which proceeds with reference to the accompanying drawings.

DETAILED DESCRIPTION OF THE INVENTION

Figure 1:
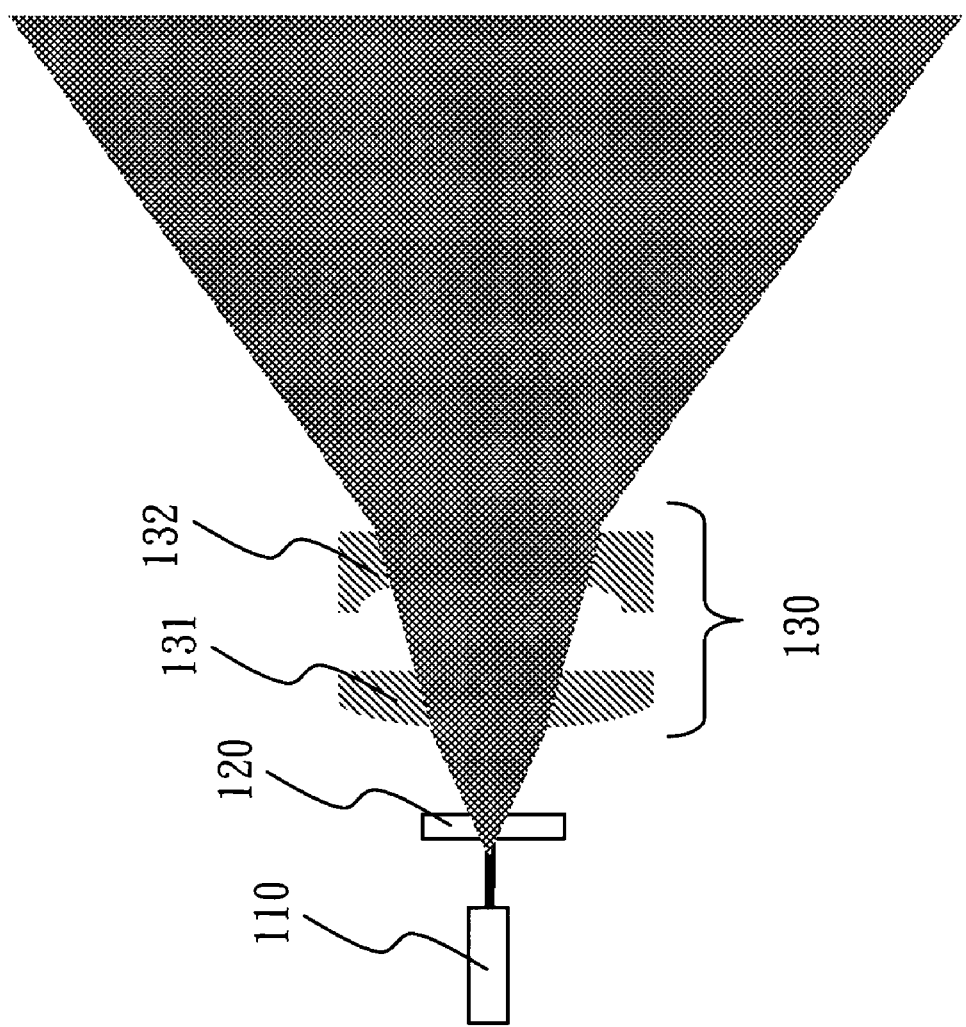
FIG. 1 is a schematic view of a first embodiment of the invention.

Refer to FIG. 1 for a first embodiment of the invention. The virtual keyboard image projection apparatus includes a laser light source 110, a diffractive optical element 120 and a projection lens 130. The laser light source 110 provides a light beam which passes through the diffractive optical element 120 to generate a virtual keyboard image light beam with a diverging angle; then passes through the projection lens 130 to increase the diverging angle of the virtual keyboard image light beam. The projection lens 130 consists of a plano-convex lens 131 and a plano-concave lens 132. Finally, a virtual keyboard image is formed. As the diverging angle of the virtual keyboard image increases, the projection distance for generating the virtual keyboard image is shortened.

Figure 2:
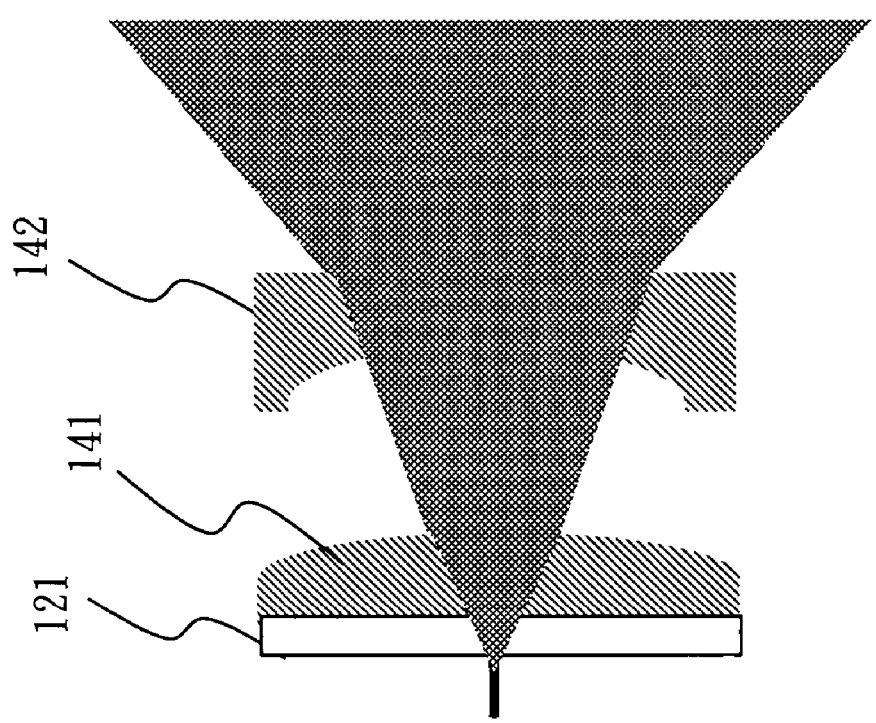
FIG. 2 is a schematic view of another type of lens set of the projection lens of the invention.

The projection lens may be any combination of diverging lenses, such as assemblies of a convex lens and a concave lens. The diffractive optical element may also be coupled on the projection lens. Refer to FIG. 2 for another type of lens set of the projection lens. The projection lens 140 consists of a plano-convex lens 141 and a plano-concave lens 142. The plano-convex lens 141 is close to the end where the laser light source is located (not shown in the drawing). The flat side is abutting the laser light source. The diffractive optical element 121 is bonded to the flat side.

Figure 3:
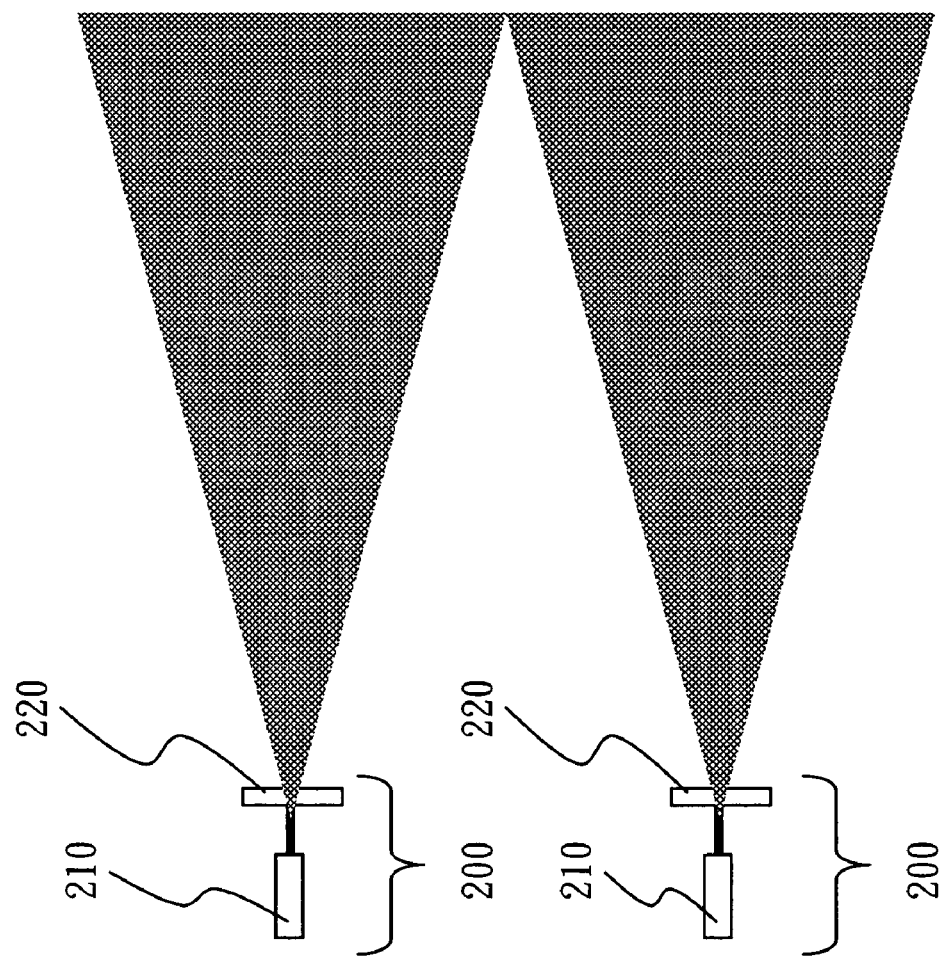
FIG. 3 is a schematic view of a second embodiment of the invention.

Moreover, through the coupling methods of the virtual keyboard image, the projection distance of the projection apparatus for generating the virtual keyboard image may also be shortened. Refer to FIG. 3 for a second embodiment of the invention. It includes two image projection assemblies 200, each consisting of a laser light source 210 and a diffractive optical element 220. The laser light source 210 provides a laser light beam. The diffractive optical element receives the laser light beam and generates a virtual keyboard image. Then the two virtual keyboard images are coupled to form a complete virtual keyboard image.

Figure 4:
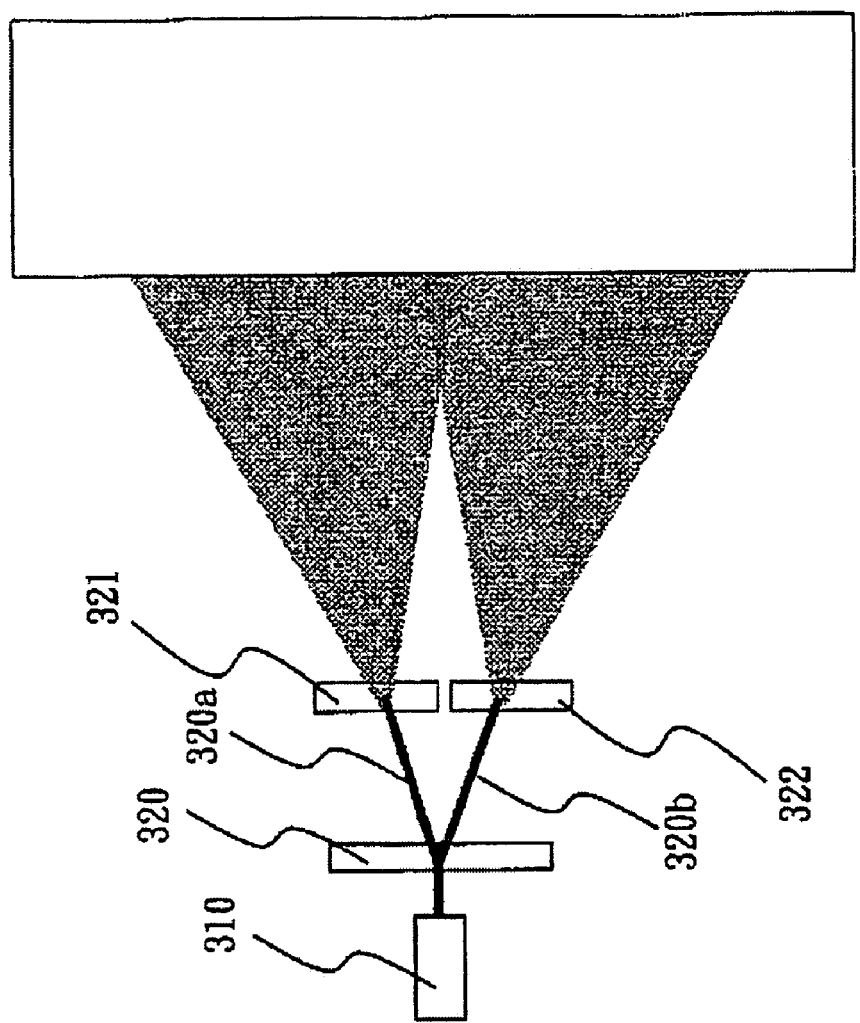
FIG. 4 is a schematic view of a third embodiment of the invention.

Refer to FIG. 4 for a third embodiment of the invention. It includes a laser light source 310, a spectroscopic element 320, a first diffractive optical element 321 and a second diffractive optical element 322. The single laser light source 310 emits a light beam which passes through the spectroscopic element 320 and is split into a first laser light beam 320*a* and a second laser light beam 320*b* that pass through the first diffractive optical element 321 and the second diffractive optical element 322, to form respectively a first virtual keyboard image and a second virtual keyboard image. Then the first virtual keyboard image and the second virtual keyboard image are coupled to form a complete virtual keyboard image.

The invention provides additional elements such as the projection lens, which may be made by plastic injection process and may be mass-produced. Compared with the conventional methods that increase the image diverging angle by shrinking the line width of the diffractive optical element, the invention provides a much simpler fabrication process and can significantly reduce costs.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A virtual input element image projection apparatus adopted for use on electronic products to provide a virtual input element image, comprising:
    a light source for providing a light beam;
    a diffractive optical element, which receives the light beam, so as to generate a virtual input element image light beam, wherein the virtual input element image light beam has a diverging angle; and
    a projection lens, which receives the virtual input element image light beam for increasing the diverging angle of the virtual input element image light beam, thereby forming the the virtual input element image.

2. The virtual input element image projection apparatus of claim 1, wherein the projection lens consists of a convex lens and a concave lens.

3. The virtual input element image projection apparatus of claim 1, wherein the projection lens consists of a plano-convex lens and a plano-concave lens.

4. The virtual input element image projection apparatus of claim 1, wherein the diffractive optical element is coupled on the projection lens.

5. The virtual input element image projection apparatus of claim 1, wherein the light beam is a laser light beam.

6. A virtual input element image projection apparatus adopted for use on electronic products to provide a virtual input element image, comprising:
    a light source for providing a light beam;
    a spectroscopic element, which receives the light beam, so as to form a first light beam and a second light beam;
    a first diffractive optical element for receiving the first light beam and forming a first virtual input image; and
    a second diffractive optical element for receiving the second light beam and forming a second virtual input image, wherein the second virtual input image is coupled with the first virtual input image to complete the virtual input element image.

7. The virtual input element image projection apparatus of claim 6, wherein the light beam is a laser light beam.

* * * * *